United States Patent
Betz, II et al.

(10) Patent No.: US 12,313,173 B2
(45) Date of Patent: May 27, 2025

(54) ENHANCED LOW NOISE, LOW LEAKAGE RELIEF VALVE

(71) Applicant: Parker-Hannifin Corporation, Cleveland, OH (US)

(72) Inventors: Gerard G. Betz, II, Eden Prairie, MN (US); Anthony F. White, Crystal, MN (US); David Walter Zuk, Blaine, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 38 days.

(21) Appl. No.: 18/464,447

(22) Filed: Sep. 11, 2023

(65) Prior Publication Data

US 2024/0084907 A1    Mar. 14, 2024

Related U.S. Application Data

(60) Provisional application No. 63/377,795, filed on Sep. 30, 2022, provisional application No. 63/375,402, filed on Sep. 13, 2022.

(51) Int. Cl.
*F16K 17/04*    (2006.01)
(52) U.S. Cl.
CPC ................ *F16K 17/0406* (2013.01)
(58) Field of Classification Search
CPC .................................................. F16K 17/0406
See application file for complete search history.

(56) References Cited

U.S. PATENT DOCUMENTS

| | | | |
|---|---|---|---|
| 2,470,372 A * | 5/1949 | Roth | F16K 17/0406 137/539.5 |
| 2,794,321 A | 6/1957 | Warner et al. | |
| 2,831,758 A | 4/1958 | Warner et al. | |
| 2,857,128 A | 10/1958 | Stern | |
| 3,055,388 A * | 9/1962 | Tebb | F16K 17/0426 137/470 |
| 3,056,423 A * | 10/1962 | Lieser | F16K 47/10 137/523 |
| 4,177,840 A | 12/1979 | Neff et al. | |
| 4,474,208 A * | 10/1984 | Looney | F16K 17/0406 251/363 |
| 5,431,183 A * | 7/1995 | Seidl | F04C 14/26 137/539.5 |
| 9,207,687 B2 | 12/2015 | Anderson | |

(Continued)

*Primary Examiner* — P. Macade Nichols
(74) *Attorney, Agent, or Firm* — Renner, Otto, Boisselle & Sklar, LLP

(57) ABSTRACT

An enhanced low noise relief valve renders the anodizing processing irrelevant to the low leakage nature of the valve member based on the tolerance between the tube portion of the valve member and the inlet bore of the machined housing. This is accomplished by providing an additional valve stem holder that acts as a stem holder through which at least part of the tube portion of the valve member extends, with the stem holder instead of the valve member tube being located adjacent to the bore of the machined housing. The stem holder does not need to be subject to the anodizing process, and therefore a tight tolerance between the valve member and stem holder provides adequate leakage control, and the anodizing process applied to the machined housing otherwise is separated from the location where leakage tolerance is critical.

19 Claims, 3 Drawing Sheets

(56) References Cited

U.S. PATENT DOCUMENTS

| | | | | |
|---|---|---|---|---|
| 2005/0061372 | A1* | 3/2005 | McGrath | F02M 69/54 |
| | | | | 137/539.5 |
| 2011/0048554 | A1 | 3/2011 | Finstad et al. | |
| 2012/0285556 | A1* | 11/2012 | Erb | F02M 37/0029 |
| | | | | 137/539.5 |
| 2014/0020772 | A1* | 1/2014 | Anderson | F16K 15/044 |
| | | | | 137/505.11 |

* cited by examiner

ENHANCED LOW NOISE, LOW LEAKAGE RELIEF VALVE

This application claims the benefit of U.S. patent application Ser. No. 63/375,402 filed Sep. 13, 2022, and U.S. patent application Ser. No. 63/377,795 filed Sep. 30, 2022, each of which is hereby incorporated herein by reference in its entirety.

FIELD OF INVENTION

The present application relates generally to a relief valve, and more particularly to a direct-acting, differential piston type relief valve that has low noise and low leakage.

BACKGROUND

Direct-acting, differential piston relief valves are used to provide a quick opening for excessive hydraulic pressure. Such valves conventionally are characterized by a structure in which the regulated hydraulic pressure is applied directly to a primary piston area.

FIG. 1 is a drawing depicting a cross-sectional view of an exemplary conventional low noise relief valve, similar to a valve described in Applicant's U.S. Pat. No. 9,207,687, the contents of which are incorporated here by reference. FIG. 1 here is reproduced as a simplified schematic of a valve having a comparable structure as in the referenced patent. Referring to FIG. 1, an exemplary valve assembly includes a valve housing (1) that houses a generally tubular valve member (or valve tube) (2), including a tube portion (2a) and a seat portion (2b). The valve member (2) is axially moveable in a bore (7) of the valve housing (1), and the diameter of the bore (7) is approximately equal to the outer diameter of the tube portion (2a).

The valve member (2) may be held in position by a compression spring (3) against a valve seat, which may be, for example, a steel ball (4) which is held in a cavity by a plug (5). The compression spring (3) may extend around at least a section of the tube portion (2a) and may be positioned, for example, in a counterbore (7a) downstream of the inlet of the bore (7). Specifically, the spring may be positioned against a ledge formed by the counterbore and extend between the ledge of the counterbore and a back side of the seat portion (2b) of the valve member (2).

The seat portion (2b) seals against the valve seat/ball (4), and the seat portion (2b) has an inner face exposed to pressure in the fluid passageway through the tube portion (2a) of the valve member (2). The seat portion (2b) has a larger diameter than the outer diameter of the tube portion (2a), and the seat portion (2b) also is exposed to pressure in the passageway through the tube portion (2a). The ball (4) may be held in position by a surface of the plug (5) which limits motion of the ball (4) and adds to valve stability, with the plug being threaded within the housing via threads (5a). Fluid flows through the tubular valve member (2) via the fluid passage through the tube portion (2a) to the ball (4). As pressure increases, force increases on the valve member (2) in opposition to the compression spring (3) because of the differential area between the exposed diameters of the portions of the valve member (2). When this force begins to exceed the spring force, the relief valve member (2) will begin to unseat from the valve seat/ball (4), thereby limiting the pressure upstream of the valve member by allowing fluid to flow through the valve member (2) to the outlet (8), which for example may be a drain or exhaust pathway to tank.

The tube portion (2a) of the valve member (2) is designed to have a close fit to the internal surface of the housing (1) resulting in low leakage, and limited motion except along its axis. This tight fit adds to the valve's stability and low noise. As referenced above, therefore, the diameter of the bore (7) is approximately equal to the outer diameter of the tube portion (2a). To achieve the requisite low leakage and low noise, a tolerance down to about $1/10000^{th}$ inch is typically desirable. An issue arises, however, due to the valve housing (1) needing to be anodized for corrosion resistance during manufacture or post-processing machining of the valve housing internal surfaces, including the bore (7). As a result of the anodizing process, the tolerances of the valve member tube relative to the valve housing may not be satisfied sufficiently, which can result in a configuration that could be subject to leakage. In such cases, the entire machined valve housing (1), and perhaps additional components into which the valve is inserted for operation, must be reworked or scrapped at great expense. Unfortunately, such issues pertaining to tolerance deficiencies generally are not evident until the end of line test, after the entire trim unit assembly has been built.

SUMMARY OF THE INVENTION

The present application describes an enhanced low noise relief valve in which the anodizing processing becomes irrelevant to the low leakage nature of the valve member based on the tolerance between the tube portion of the valve member and the inlet bore of the machined housing. This is accomplished generally by providing an additional valve stem holder that acts as a stem holder through which at least part of the tube portion of the valve member extends, with the stem holder instead of the valve member tube being located adjacent to the bore of the machined housing. The stem holder does not need to be subject to the anodizing process, and therefore a tight tolerance between the valve member and stem holder provides adequate leakage control, and the anodizing process applied to the machined housing otherwise is separated from the location where leakage tolerance is critical.

In exemplary embodiments, a relief valve includes a valve housing having an inlet and an outlet, the valve housing further defining a bore formed between the inlet and the outlet; a valve member positioned in the bore and having a tube portion and a valve seat portion, the valve seat portion having a diameter that is larger than an outside diameter of the tube portion, and a valve seat. A spring is positioned about at least a portion of the tube portion of the valve member and biases the valve member to seal against the valve seat. The valve member and valve seat prevent fluid flow from the inlet to the outlet when pressure at the inlet is below a predetermined pressure that is less than or equal to a spring force of the spring, and the valve member moves axially away from the valve seat at the predetermined pressure by overcoming the spring force allowing fluid flow from the inlet to the outlet. A stem holder receives the tube portion of the valve member, and an outer surface of the stem holder is positioned adjacent to an inner surface of the bore such that the tube portion of the valve member is spaced apart from the inner surface of the bore of the housing.

The stem holder may have one of a variety of potential configurations. The stem holder may be configured with an outer surface of the stem holder fixedly secured into the inner surface of the bore, such as by being threaded into the inner surface of the bore of the valve housing. The stem holder may be configured as a cartridge housing that is fixedly secured into an inner surface of the housing, and the cartridge housing houses the valve member, spring, and valve seat. The stem holder may be configured as a valve body that is received within the bore of the housing, and the valve body houses the valve member, spring, and valve seat. The stem holder may be configured as a cartridge housing that is positioned along an inner surface of the housing, and the cartridge housing houses the valve member, spring, and valve seat, with the cartridge housing comprising a cartridge body and a cartridge end cap, wherein the cartridge end cap has a first end oriented towards the inlet and a second end opposite from the first end that is fixedly secured within the cartridge body. The stem holder may be configured as such a cartridge housing comprising a cartridge body and a cartridge end cap, wherein a plug and the cartridge body are combined into a single component.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
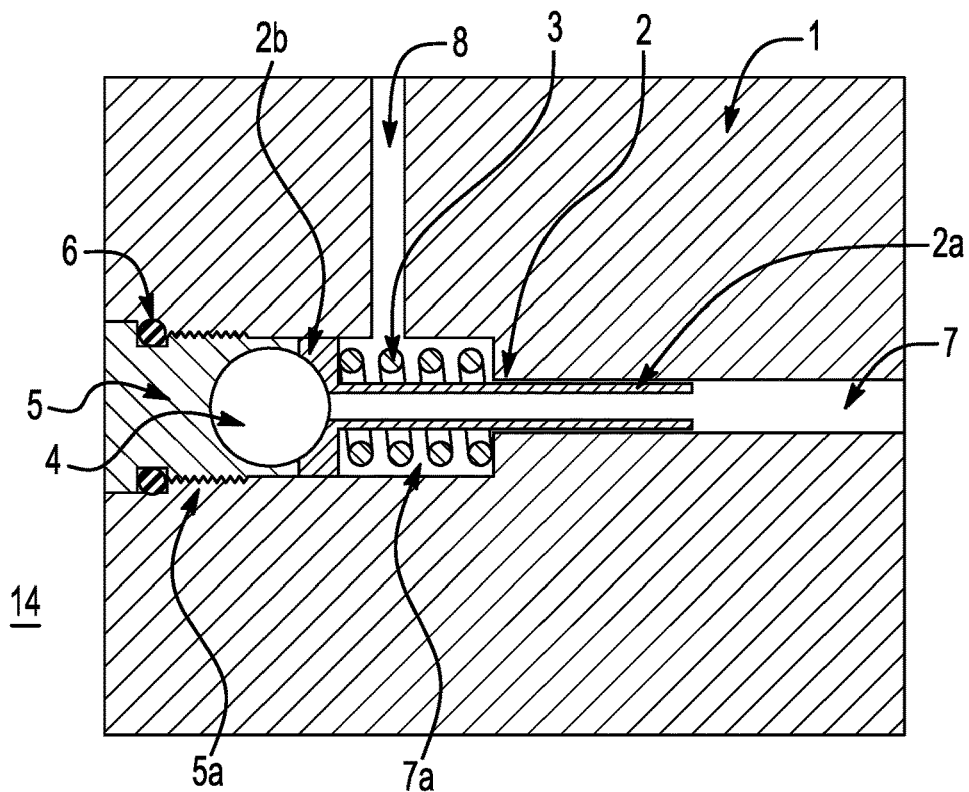
FIG. 1 is a drawing depicting a cross-sectional view of an exemplary conventional low noise relief valve.

Embodiments of the present application will now be described with reference to the drawings, wherein like reference numerals are used to refer to like elements throughout. It will be understood that the figures are not necessarily to scale.

The present application describes an enhanced low noise relief valve in which the anodizing processing becomes irrelevant to the low leakage nature of the valve member based on the tolerance between the tube portion of the valve member and the inlet bore of the machined housing. This is accomplished generally by providing an additional valve stem holder that acts as a separate holder through which at least part of the tube portion of the valve member extends, with the stem holder instead of the valve member tube being located adjacent to the bore of the machined housing. The stem holder does not need to be subject to the anodizing process, and therefore a tight tolerance between the valve member and stem holder provides adequate leakage control, and the anodizing process applied to the machined housing otherwise is separated from the location where leakage tolerance is critical.

FIGS. 2-6 are drawings depicting embodiments of a relief valve that include such a valve stem holder in various configurations. As such embodiments are variations and enhancements relative to the conventional configuration depicted in FIG. 1, like reference numerals are used to refer to like components in FIGS. 2-6 relative to FIG. 1.

Figure 2:
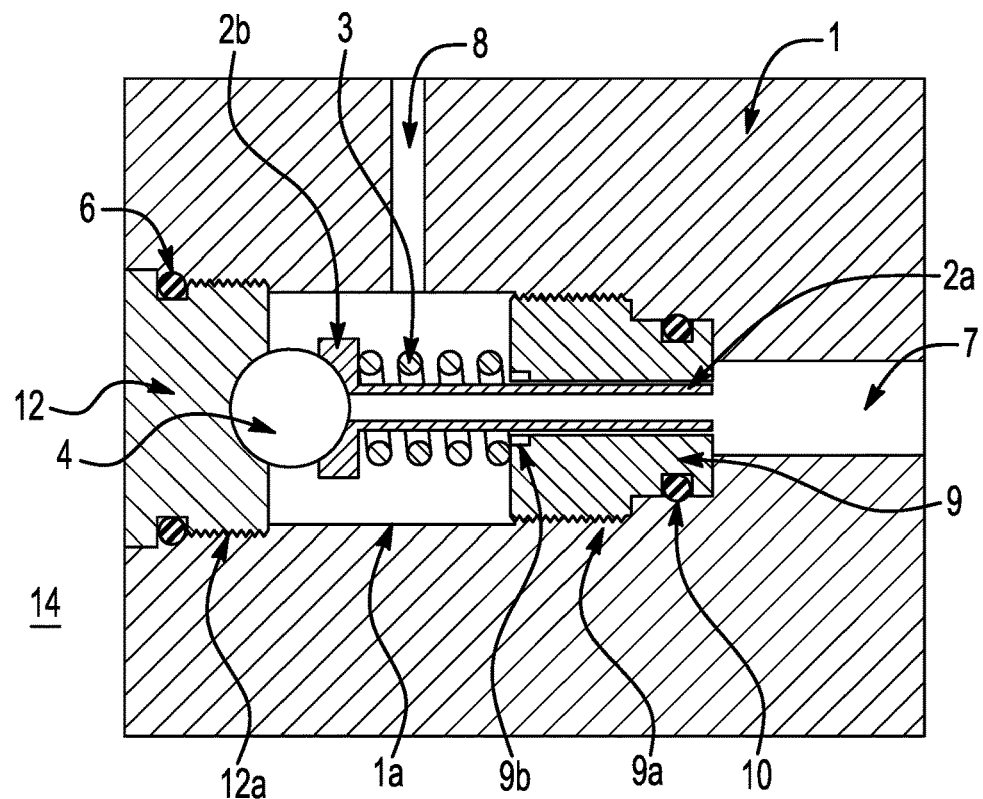
FIG. 2 is a drawing depicting a first embodiment of a low noise, low leakage relief valve including a valve stem holder.

FIG. 2 is a drawing depicting a first embodiment of an enhanced low noise, low leakage relief valve assembly. In the embodiment of FIG. 2, the valve assembly further includes a separate valve stem holder (9), which is a provided as a loose part separate from the machined housing (1). The valve stem holder (9) may be made of stainless steel or other comparable material, which is different from the cast aluminum typical of the machined housing (1). In so doing, the valve stem holder (9) does not need to be anodized, decoupling the requirements of close tolerance post-machining and post-anodizing for corrosion resistance of the tube portion relative to the housing. The valve stem holder (9) also provides greater durability over time as compared to a conventional anodized aluminum machined housing (1).

An O-ring (10) is added to provide a seal between the valve stem holder (9) and the machined housing (1) to provide fluid isolation between the inlet port (7) and the exhaust port (8) through the valve housing (1). The diameter of the counterbore (1a) is such that said diameter is greater than the major diameter of the threads (9a) in the housing (1) that engage the valve stem holder (9), and less than the minor diameter of the threads (12a) in the housing (1) that engage a cap (12) that maintains the valve seat and valve member within the housing. This allows for the installation of the valve stem holder (9) through the opening provided to receive the cap (12). Once inserted, the stem holder (9) may be fixedly secured to the housing by the threading (9a). Then, the cap (12) also may be fixedly secured to the housing by the threading (12a). A second O-ring (6) may be provided to seal between the cap (12) and the machined housing (1) relative to the environment (14). Internal features (9b) in the stem holder (9) may be fashioned as torx, hex, or some other internal feature shape, which are used to torque the stem holder (9) to the machined housing (1) during installation.

The configuration of FIG. 2 decouples the requirement for a closely dimensioned bore (7) of the machined housing (1) from the rest of the surface features on large, complicated, machined cast housings, and renders the first yield pass rate insensitive to the anodizing and machining processes performed in conventional configurations. Furthermore, if issues are encountered with defects in the valve stem holder (9), the valve stem holder can be replaced more easily and cheaply without having to scrap the entire machined casted housing (1), as is done in conventional configurations when anodizing undermines the requisite close fit with the tube portion of the valve member.

Figure 3:
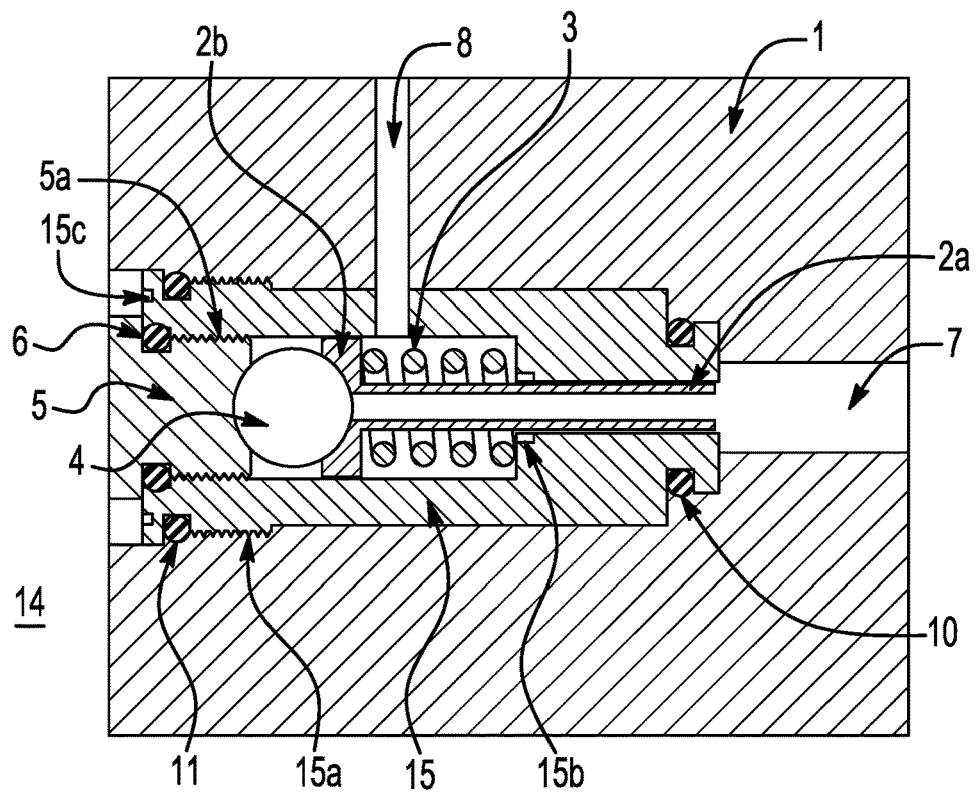
FIG. 3 is a drawing depicting a second embodiment of a low noise, low leakage relief valve in which the valve stem holder is configured as a cartridge housing that houses valve components.

FIG. 3 is a drawing depicting a second embodiment of an enhanced low noise, low leakage relief valve. In the embodiment of FIG. 3, the valve stem holder is configured as a cartridge housing (15) that houses multiple valve components including the valve member (2a)/(2b), spring (3), and the valve seat (ball) (4). An O-ring (10) is added to provide a seal between the cartridge housing (15) and the machined housing (1) to provide fluid isolation between the inlet port (7) and the exhaust or outlet port (8), and an O-ring (11) further is added to provide a seal between the cartridge housing (15) and the machined housing (1) to provide fluid isolation between the exhaust port (8) and the environment (14). In this configuration, the O-ring (6) further seals between the cap (5) and the cartridge housing (15) relative to the environment (14).

In the exemplary embodiment of FIG. 3, use of the cartridge housing (15) permits the valve components to be pre-assembled into a separate sub-assembly. In other words, the valve member (2), spring (3), and valve seat/ball (4) may be located within the cartridge housing (15), and then the cap (5) including the seal (6) is threaded via threads (5a) or otherwise fixedly secured into the cartridge housing (15) to maintain the valve seat, spring, and valve member within the cartridge housing. Internal features for a spanner wrench (15c) may be used to provide the installation torque for the entire sub-assembly. Such sub-assembly can therefore be built and tested on a sub-assembly line prior to incorporation into the anodized cast housing (1), and then threaded into the housing via threads (15a). The embodiment of FIG. 3, therefore, has the benefits of the first embodiment, and the additional benefit of being able to assemble the valve components as a separate sub-assembly that can be tested in a sub-assembly test machine prior to presentation at the final trim assembly line. As a result, the sub-assembly of the valve components can be externally sourced and tested by a supplier, freeing up assembly resources required in conventional processes. As an alternative to a sub-assembly implementation, internal features embodied as torx or hex shape features (15b) may be used to install and torque the cartridge housing (15) to the housing (1) similarly as in the first embodiment.

Figure 4:
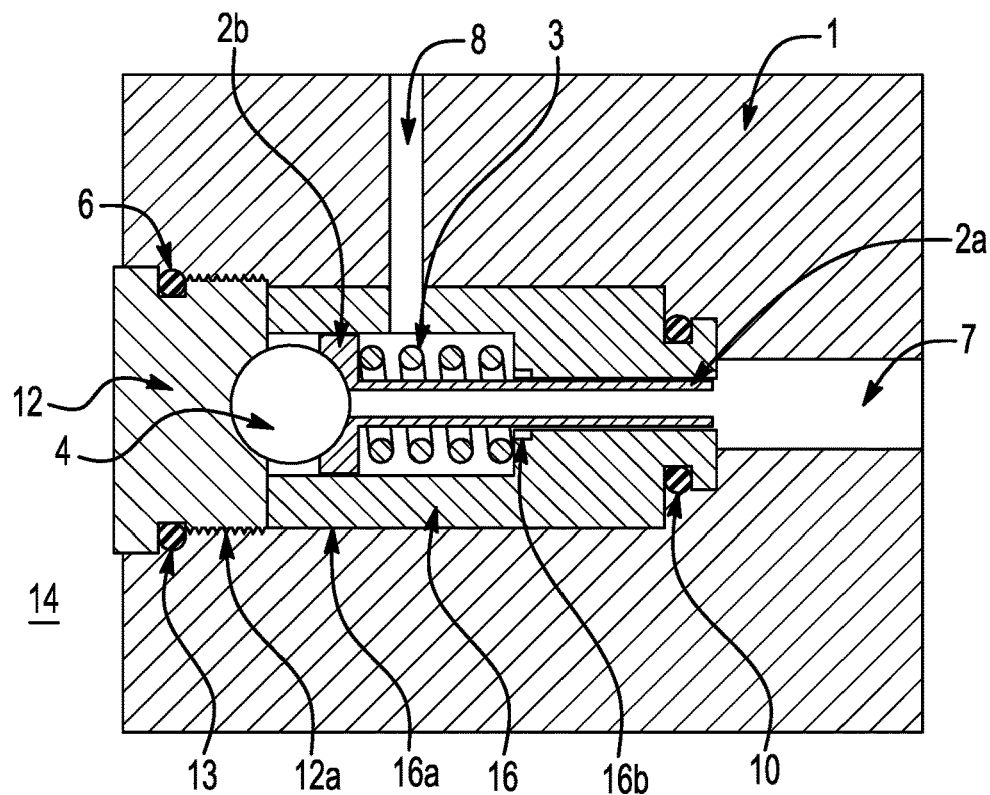
FIG. 4 is a drawing depicting a third embodiment of a low noise, low leakage relief valve in which the valve stem holder is configured as a valve body that is received within the bore of the valve housing.

FIG. 4 is a drawing depicting a third embodiment of an enhanced low noise, low leakage relief valve. In the embodiment of FIG. 4, the valve stem holder is configured as a valve body (16), which is torqued using a larger plug (12). The plug (12) may be an SAE plug that is threaded into the housing (1) via threads (12a). The valve body (16) may be positioned within the housing (1) at a close fit along the valve body surface (16a), with the valve components including the valve member (2), spring (3), and valve seat (ball) (4) being housed in the valve body (16). The plug (12) then may be threaded into or otherwise fixedly secured into the machined housing (1) to secure the valve components within the housing. An O-ring (10) is added to provide a seal between valve body (16) and the machined housing (1) to provide fluid isolation between the inlet port (7) and the exhaust port (8). A second O-ring (6) may be provided to further seal between the plug (12) and housing (1) relative to the environment (14).

In this configuration of the third embodiment of FIG. 4, the plug (12) does not interface in a fixedly secured manner directly to the valve body (16), in contrast to the cartridge housing (15) of the previous embodiment (again, in the previous embodiment the cap (5) is threaded or otherwise fixedly secured into the cartridge housing (15)). Comparing the second and third embodiments, by providing the valve body (16) acting as the valve stem holder and the cap (12) as components that are not fixedly secured to each other, such configuration of the third embodiment eliminates the need for the additional O-ring (11) of the previous embodiment. However, the third embodiment is not configurable as a separate sub-assembly that can be independently supplied and tested, insofar as the valve body (16) and cap (12) cannot remain fixedly secured to each other outside of the machined housing (1). Internal torx or hex shape features feature (16b) may be included to aid in assembly or disassembly.

Figure 5:
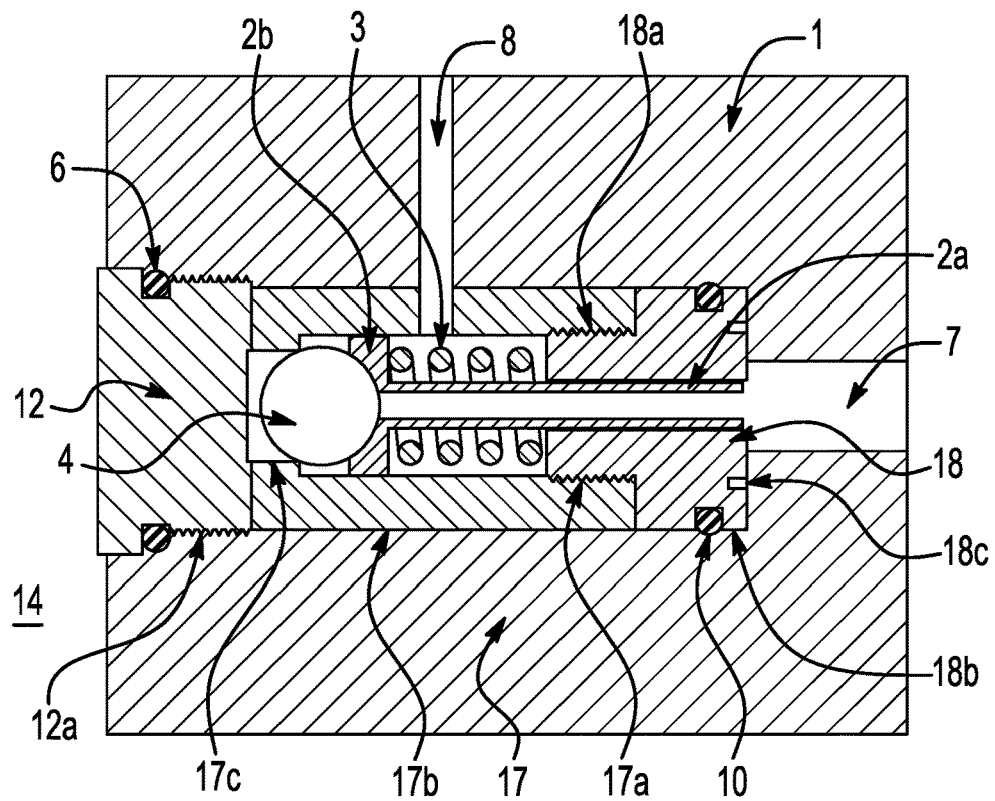
FIG. 5 is a drawing depicting a fourth embodiment of a low noise, low leakage relief valve that combines features of the second and third embodiments in which the cartridge housing has two components.

FIG. 5 is a drawing depicting a fourth embodiment of an enhanced low noise, low leakage relief valve. The fourth embodiment of FIG. 5 in large part combines features of the second and third embodiments of FIGS. 3 and 4 by: (A) providing the ability for the valve components to be pre-assembled into a separate sub-assembly similarly as the second embodiment of FIG. 3, thereby permitting testing the sub-assembly separately prior to being introduced on the main assembly line; while (B) keeping the part count comparable as in the third embodiment of FIG. 4. The fourth embodiment of FIG. 5 also provides for a smaller package with a stronger wall in the cartridge body as compared to the third embodiment of FIG. 4. This is accomplished in the embodiment of FIG. 5 by having the cartridge housing being configured in two parts.

In particular, referring to FIG. 5, a cartridge housing includes a cartridge body (17) and a cartridge end cap (18). The cartridge end cap (18) is configured having a first end oriented towards the pressure or inlet port (7), and a second end opposite from the first end and that is fixedly secured within the cartridge body (17), such as for example by threads (17a) and (18a). This configuration allows for sub-assembly of the valve seat/ball (4), valve stem (2), and spring (3) into cartridge body (17), and then installing cartridge end cap (18) into the cartridge body (17), which all can then be tested as a sub-assembly prior to inserting the sub-assembly into the machined housing (1) and installing the threaded plug (12) via the threads (12a). The cartridge end cap (18) may be attached to the cartridge body (17) by the external threads (18a) of the cartridge end cap (18) that mate with internal threads (17a) of the cartridge body (17).

During installation, the sub-assembly, including the two-part cartridge housing (17)/(18), is inserted into the machined housing (1) along the internal housing surface (17b). The plug (12) then may be threaded into or otherwise fixedly secured into the machined housing (1) via threads (12a) to secure the valve components within the housing. An O-ring (10) is added to provide a seal between cartridge end cap (18) and the machined housing (1) to provide fluid isolation between the inlet port (7) and the exhaust port (8). A second O-ring (6) may be provided to further seal between the plug (12) and housing (1) relative to the environment (14). Installation torque is applied to the cartridge end cap (18) by way of spanner wrench features (18c), or flats machined onto the outer diameter (18b) of the cartridge end cap, or a hex feature as the outer periphery of the outer diameter (18b) of the cartridge end cap. Installation torque alternatively may be applied using a slot across an outside face of the cartridge end cap (18) that is located in the pressure port (7). The cartridge body (17) may include an inner diameter that has a hole (17c) for locating the valve seat/ball (4) within the cartridge body (17) of the cartridge housing. The cartridge body (17) therefore can be machined to accurately position the ball (4) relative to the center of valve stem (2).

Figure 6:
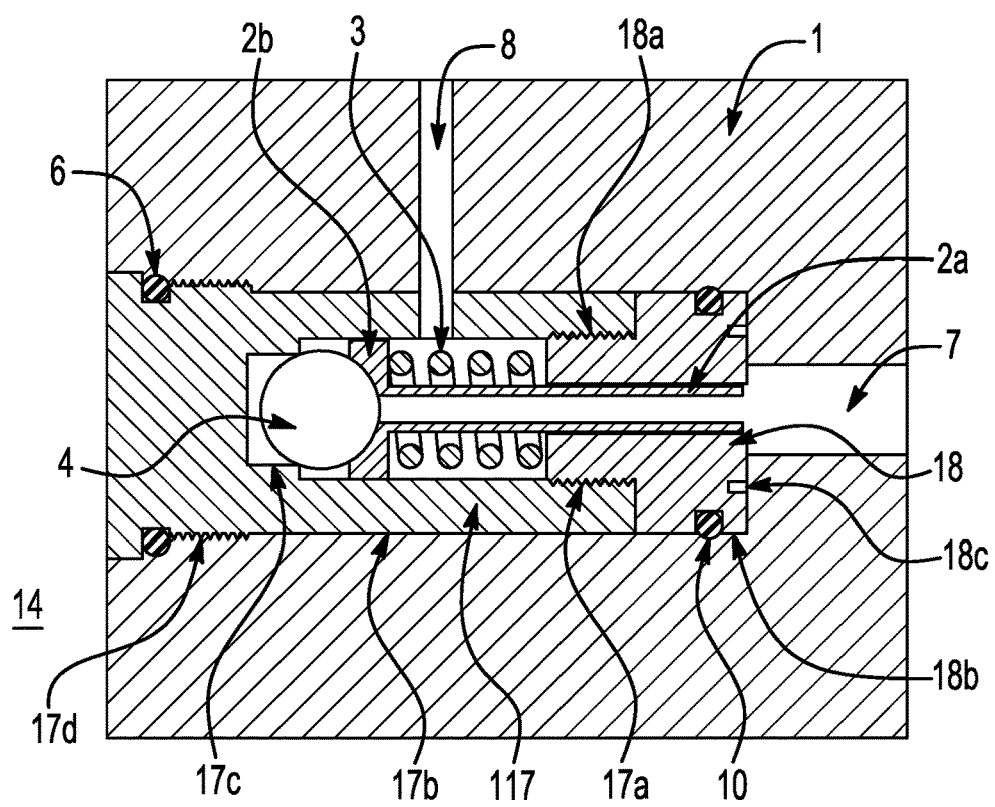
FIG. 6 is a drawing depicting a fifth embodiment of a low noise, low leakage relief valve that is a variation of FIG. 5 in which a valve stem holder cartridge is combined with a valve plug into a single component.

FIG. 6 is a drawing depicting a fifth embodiment of an enhanced low noise, low leakage relief valve. The embodiment of FIG. 6 is comparable to the embodiment of FIG. 5, except in the embodiment of FIG. 6 the plug and cartridge body are combined into a single component, cartridge plug 117. The configuration of FIG. 6 also permits the valve components to be combined as a subassembly that effectively includes the cap structure, thereby permitting testing the sub-assembly separately prior to being introduced on the main assembly line. The cartridge plug (117) with the valve components then may be threaded into or otherwise fixedly secured into the machined housing (1) via threads (17d) to secure the valve components within the housing.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A relief valve comprising:
    a valve housing having an inlet and an outlet, the valve housing further defining a bore formed between the inlet and the outlet;
    a valve member positioned in the bore and having a tube portion and a valve seat portion, the valve seat portion having a diameter that is larger than an outside diameter of the tube portion;
    a valve seat;
    a spring positioned about at least a portion of the tube portion of the valve member and biasing the valve member to seal against the valve seat;
    wherein the valve member and valve seat prevent fluid flow from the inlet to the outlet when pressure at the inlet is below a predetermined pressure that is less than or equal to a spring force of the spring, and wherein the valve member moves axially away from the valve seat at the predetermined pressure by overcoming the spring force allowing fluid flow from the inlet to the outlet; and
    a stem holder that receives the tube portion of the valve member, and an outer surface of the stem holder is positioned adjacent to an inner surface of the bore such that the tube portion of the valve member is spaced apart from the inner surface of the bore of the housing;
    wherein the outer surface of the stem holder is fixedly secured into the inner surface of the bore.

2. The relief valve of claim 1, wherein the outer surface of the stem holder is threaded into the inner surface of the bore.

3. The relief valve of claim 1, further comprising a cap that includes a surface for receiving the valve seat, and the cap is fixedly secured to the housing to maintain the valve seat and valve member within the housing.

4. The relief valve of claim 3, wherein the cap is threaded into the housing.

5. The relief valve of claim 3, further comprising a first O-ring that seals between the stem holder and the housing to provide fluid isolation between the inlet and the outlet, and a second O-ring that seals between the cap and the housing relative to the environment.

6. The relief valve of claim 1, wherein the stem holder is a valve body that is received within the bore of the housing, and the valve body houses the valve member, spring, and valve seat; and
    the relief valve further comprises a plug that includes a surface for receiving the valve seat, and the plug is fixedly secured to the housing to maintain the valve seat and valve member within the valve body.

7. The relief valve of claim 6, further comprising a first O-ring that seals between the valve body and the housing to provide fluid isolation between the inlet and the outlet, and a second O-ring that seals between the plug and the housing relative to the environment.

8. The relief valve of claim 1, wherein the valve seat comprises a ball seated against the valve seat portion of the valve member when the pressure is below the predetermined pressure.

9. The relief valve of claim 1, wherein the housing is an anodized cast housing, and the stem holder is a non-anodized material.

10. The relief valve of claim 9, wherein the housing is made of aluminum and the stem holder is made of stainless steel.

11. A relief valve comprising:
    a valve housing having an inlet and an outlet, the valve housing further defining a bore formed between the inlet and the outlet;
    a valve member positioned in the bore and having a tube portion and a valve seat portion, the valve seat portion having a diameter that is larger than an outside diameter of the tube portion;
    a valve seat;
    a spring positioned about at least a portion of the tube portion of the valve member and biasing the valve member to seal against the valve seat;
    wherein the valve member and valve seat prevent fluid flow from the inlet to the outlet when pressure at the inlet is below a predetermined pressure that is less than or equal to a spring force of the spring, and wherein the valve member moves axially away from the valve seat at the predetermined pressure by overcoming the spring force allowing fluid flow from the inlet to the outlet; and
    a stem holder that receives the tube portion of the valve member, and an outer surface of the stem holder is positioned adjacent to an inner surface of the bore such that the tube portion of the valve member is spaced apart from the inner surface of the bore of the housing;
    wherein the stem holder is a cartridge housing that is fixedly secured into an inner surface of the housing, and the cartridge housing houses the valve member, spring, and valve seat; and
    the relief valve further comprises a cap that includes a surface for receiving the valve seat, and the cap is fixedly secured into the cartridge housing to maintain the valve seat and valve member within the cartridge housing.

12. The relief valve of claim 11, wherein the cartridge housing is threaded into the housing, and the cap is threaded into the cartridge housing.

13. The relief valve of claim 11, wherein valve components including the cartridge housing that houses the valve member, spring, and valve seat, and the cap, are configurable as a sub-assembly independently from the housing.

14. The relief valve of claim 11, further comprising a first O-ring that seals seal between the cartridge housing and the housing to provide fluid isolation relative to the environment; and further comprising a second O-ring that seals between the cartridge housing and the cap to provide fluid isolation relative to the environment, and a third O-ring that seals between the cartridge housing and the housing to provide fluid isolation between the inlet and the outlet.

15. A relief valve comprising:
a valve housing having an inlet and an outlet, the valve housing further defining a bore formed between the inlet and the outlet;
a valve member positioned in the bore and having a tube portion and a valve seat portion, the valve seat portion having a diameter that is larger than an outside diameter of the tube portion;
a valve seat;
a spring positioned about at least a portion of the tube portion of the valve member and biasing the valve member to seal against the valve seat;
wherein the valve member and valve seat prevent fluid flow from the inlet to the outlet when pressure at the inlet is below a predetermined pressure that is less than or equal to a spring force of the spring, and wherein the valve member moves axially away from the valve seat at the predetermined pressure by overcoming the spring force allowing fluid flow from the inlet to the outlet; and a stem holder that receives the tube portion of the valve member, and an outer surface of the stem holder is positioned adjacent to an inner surface of the bore such that the tube portion of the valve member is spaced apart from the inner surface of the bore of the housing;
wherein the stem holder is a cartridge housing that is positioned along an inner surface of the housing, and the cartridge housing houses the valve member, spring, and valve seat;
the cartridge housing comprising a cartridge body and a cartridge end cap, wherein the cartridge end cap has a first end oriented towards the inlet and a second end opposite from the first end that is fixedly secured within the cartridge body; and
the relief valve further comprises a plug that is fixedly secured to the housing to maintain the cartridge housing within the housing.

16. The relief valve of claim 15, wherein the second end of the cartridge end cap is threaded into the cartridge body, and the plug is threaded into the housing.

17. The relief valve of claim 15, further comprising a first O-ring that seals between the cartridge end cap and the housing to provide fluid isolation between the inlet and the outlet, and a second O-ring that seals between the plug and the housing relative to the environment.

18. The relief valve of claim 15, wherein valve components including the cartridge housing that houses the valve member, spring, and valve seat are configurable as a sub-assembly independently from the housing.

19. The relief valve of claim 15, wherein the plug and the cartridge body are configured as a single, integrated component.

* * * * *